United States Patent [19]

Stearns et al.

[11] 4,326,376
[45] Apr. 27, 1982

[54] GOVERNORLESS GAS TURBINE FUEL CONTROL

[75] Inventors: Charles F. Stearns, East Longmeadow, Mass.; David L. Chapski, West Suffield; Kenneth F. Vosseller, Enfield, both of Conn.

[73] Assignee: United Technologies Corporation, Hartford, Conn.

[21] Appl. No.: 69,141

[22] Filed: Aug. 23, 1979

[51] Int. Cl.³ .............................................. F02C 9/04
[52] U.S. Cl. ............................................ 60/39.28 R
[58] Field of Search ........................ 60/39.28 R, 243

[56] References Cited

U.S. PATENT DOCUMENTS 3,713,290  1/1973  Gold ............................. 60/39.28 R
4,078,378  3/1978  Gold ............................. 60/39.28 R

*Primary Examiner*—Robert E. Garrett
*Attorney, Agent, or Firm*—Robert E. Greenstien

[57] ABSTRACT

Fuel flow to a gas turbine engine is controlled in response to power lever position and CDP. Fuel is supplied to the engine through three fuel flow regulating circuits which are in parallel. In one of these circuits there is a valve which establishes a minimum fuel flow which decreases with increasing power lever advance. In a second circuit there is a valve which modifies fuel flow in response to CDP. In a third circuit there is a valve which modifies fuel flow in response to CDP and receives fuel from a valve which opens with increasing power lever advance. The fuel control system includes a low power sensitive torque motor which may be activated to increase the pressure drop across the three circuits whose flow thus increases proportionally. Normal engine operation is obtainable without the use of the torque motor which provides an interface to an electronic control unit which senses various engine and ambient parameters and activates the torque motor in order to modify fuel flow accordingly.

4 Claims, 3 Drawing Figures

GOVERNORLESS GAS TURBINE FUEL CONTROL

CROSS-REFERENCE TO RELATED APPLICATIONS

This and the following copending applications were filed on the same date, are assigned to the same assignee and disclose related subject matter: Ser. No. 069,139, HYDROMECHANICAL FUEL CONTROL WITH INDEPENDENT ELECTROMECHANICAL INTERFACE, by Stearns; Ser. No. 069,142, ELECTRONIC FUEL CONTROL SYSTEM, by Martin; and Ser. No. 069,140, NEGATIVE RATE COMPENSATED HYDRAULIC SERVO SYSTEM, by Stearns.

BACKGROUND OF THE INVENTION

This invention relates to fuel controls, in particular, fuel controls for gas turbine engines.

The steady state operating characteristics of the typical gas turbine engine are such that as engine speed (N) increases the ratio between fuel flow ($W_f$) and compressor discharge pressure (CDP) must be increased. The ratio, $W_f$/CDP, is commonly referred to as ratio units. At low engine speeds, near idle, for example, another important characteristic of the gas turbine engine is that the differences between ratio units at different speeds are quite small. In other words, the steady state curve is substantially horizontal in the idle regions; in fact, it actually may have a reverse slope at low speeds.

The principal purpose for a gas turbine engine fuel control is to schedule fuel flow to the engine in a prescribed relationship to compressor discharge pressure in response to the power demands and changes made through a power lever. Generally speaking, the fuel control varies the ratio units in relation to engine power settings: During acceleration and high power demand conditions the ratio units are high; during low power operating conditions, such as deceleration, the ratio units are small. Thus, the fuel control may be viewed as scheduling the ratio units between prescribed minimum and maximum levels. For any particular power lever advance (PLA) the relationship between ratio units and engine speed ideally is constant. The intersection of the engine steady state line and the ratio unit line occurs at the engine's steady state speed for that PLA, which thus defines the particular ratio unit at that speed. At moderate and high engine speeds the intersection occurs at a significant angle. Consequently, the differences between ratio units for different speeds is quite significant, and, as a result, minor variations in ratio units do not produce significant changes in engine speed. Thus, engine speed accuracy is quite high in these regions. However, at the lower engine speeds, where the steady state curve is flat or horizontal, the intersection angles are much smaller and the operating points therefore are not nearly as well defined. Thus, at lower speeds, the engine speed accuracy may be poor, making it difficult to obtain a desired speed at a particular PLA position.

The prior art focuses on numerous ways to alleviate these accuracy problems. In general, solutions have focused on scheduling minimum ratio units at the lower engine speeds through the use of a mechanical governor in the fuel control; by scheduling a minimum fuel flow for different low power (idle) settings, the intersection angles are increased dramatically. Above idle speeds, governor operation is not necessarily utilized, however, and the ratio units may be programmed in response to CDP alone. One example of a governor system is shown and described in U.S. Pat. No. 3,611,719 for a FUEL CONTROL, issued on Oct. 12, 1971 and is commonly owned herewith.

An additional constraint imposed upon gas turbine fuel controls is the need for an absolute minimum fuel flow to the engine for any PLA beyond a shutdown position. Typically, this has been achieved by providing supplemental fuel flow control circuits which act in conjunction with the minimum fuel flow provided by the mechanical governor, that simply establishes different minimum fuel flow in the idle region for different low power PLA settings.

Another function of a gas turbine fuel control is to modify fuel flow to the engine in relation to various parameters, such as engine speed, acceleration, and temperature, and ambient temperature and pressure. The reason for this is two-fold: to increase engine operating efficiency and to prevent engine operation at certain speeds and ratio units so as to avoid operation in the engine surge region. Recent advances in fuel controls are marked by increased use of electronic interfaces with hydromechanical fuel controls to provide these fuel flow modification characteristics. Principal among these recent advances is the use of computer based systems which sense the various parameters to provide signals which modify fuel flow in the hydromechanical portion of the system. In as much as reliability is a principal factor in all fuel controls, it continues to be considered important to provide for engine operation separate and apart from the electronic portion. In other words, the electronic portion should not be used as the sole means for controlling the fuel control but, instead, as a means for modifying a basic control provided by the hydromechanical portion.

The foregoing techniques for achieving stable, efficient engine operation and establishing minimum fuel flow add considerably to the cost, maintenance and size of the fuel control system. Thus, while performance of such controls has been excellent, there is a distinct need for smaller, lighter fuel controls that accomplish the same results at significantly less cost. This is especially true for fuel controls for small turbine engines, such as those used on small, private jets and the like.

SUMMARY OF THE INVENTION

Objects of the present invention include providing a fuel control system, for turbine engines, which establishes minimum fuel flow for different power lever positions in the low power range without the utilization of a mechanical governing system.

Another object of the present invention is to provide an absolute minimum fuel flow to the engine through the use of the same means that establishes the minimum fuel flow for different power lever positions.

Still another object of the present invention is to provide a small, economical fuel control which is particularly suitable for use with small turbine engines that are used at high altitude operations.

In accordance with one aspect of the present invention the fuel control is divided into three circuits which together supply fuel to the engine. In a first of these circuits the fuel passes through a valve which regulates the fuel flow in response to power lever position. The fuel flow from this valve then passes into a valve which regulates the flow in response to CDP. In a second circuit the fuel passes through a valve which regulates the flow in response to CDP. A third circuit includes a valve which is also responsive to power lever position so as to provide minimum flow when the power lever is in the idle-deceleration range; however, as the lever is advanced, the minimum flow is progessively reduced. The three circuit system creates a family of performance curves for ratio units and engine speed at different PLA positions, which originate at the minimum fuel flow line at idle speeds and intersect the engine steady state line at a high angle, but at higher engine speeds are linearized to provide conventionally flat ratio unit schedules in response to engine speed above idle speeds.

Thus, the present invention provides a fuel control in which the intersections between the steady state line and the ratio units produced at any power lever position are clearly defined, thereby obviating the need for a governor. Moreover, since the response curves for power lever position and ratio units originate at the minimum fuel flow line that is provided at the minimum lever position, there is no need for a separate minimum fuel flow circuit; thus, significant cost savings are achieved.

Other objects, benefits and features of the invention may be apparent and obvious to one skilled in the art from the detailed description, claims and drawing that follow, wherein:

DETAILED DESCRIPTION

Figure 1:
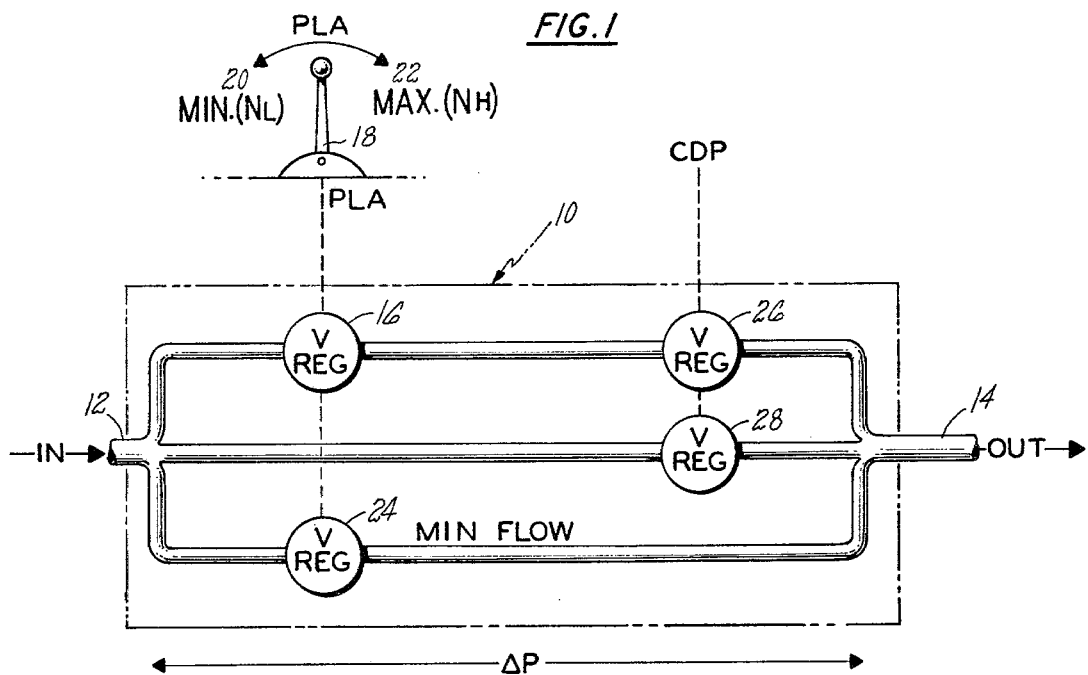
FIG. 1 is a functional block diagram of a governorless fuel control valve system.
Figure 2:
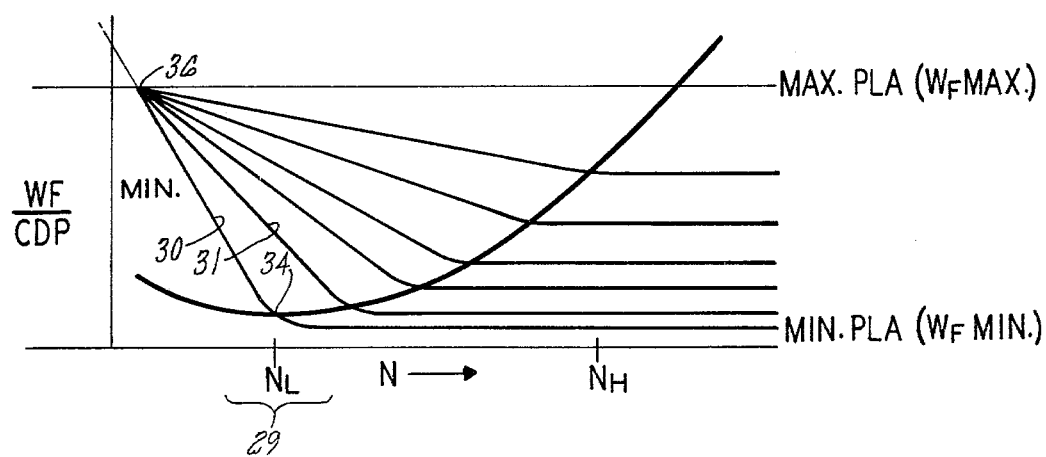
FIG. 2 is a graph showing the relationship between ratio units and engine speed produced by the fuel control of FIG. 1.

FIG. 1 shows a three circuit valve system 10 which regulates fuel flow to an engine (not shown) in response to engine CDP and requested power. FIG. 2 shows the relationship established by this system 10 between ratio units ($W_f$)/(CDP) and engine speed (N) at different power lever advance PLA positions.

Fuel is pumped to a common fuel input port 12 and exits from a common fuel output port 14 en route to the engine. A first variable window valve 16 is mechanically coupled to the engine power lever 18 which is advanceable between a fully closed position 20 and a fully opened position 22 for selecting engine speed in the range from idle ($N_L$) to full power ($N_H$). A second variable window valve 24 is also connected to the power lever 18. The fuel which flows through the valve 16 goes to another variable window valve 26 which is responsive to CDP in a way that as CDP increases, its window opening increases. Another variable window valve 28 is also responsive to CDP in the same manner, but it receives fuel directly from the input port 12. Consequently, the fuel that is supplied to the engine, at the port 14, is the sum of the fuel that exits the valves 24, 26 and 28.

Fuel pressure between the input and the output of the valve arrangement is held at a constant pressure by means of a pressure regulator, which is not shown in FIG. 1, in as much as its design and operation is well known. However, in FIG. 3 a typical pressure regulator is shown in a hydromechanical fuel system which embodies the system 10 and is described in a latter portion of the description.

The valves 16 and 24 are so arranged in their interconnection to the power lever 18 that when the lever is at the minimum power position 20, the window of valve 16 is completely closed and the window of the valve 24 is completely open. The valve 24 thus produces an absolute minimum fuel flow to the engine, regardless of CDP. In other words, even if CDP is hypothetically zero, a minimum fuel flow, from the valve 24, is provided to sustain engine operation. As the power lever is advanced (PLA is increased) towards position 22, the valve 24 closes progressively, thus reducing the minimum fuel flow. Simultaneously, however, the window of the valve 16 opens, thus increasing the fuel flow to the valve 26, whose window opening is regulated in response to CDP. Since the valve 28 receives the fuel directly from the input port 12, the flow therethrough and to the engine is simply a function of CDP, and, generally, as CDP increases (N increases) the window opening increases in a predetermined relationship to provide more fuel flow. The relationship between CDP and fuel flow is derived principally from the window configuration design and, using well known techniques, the relationship may be tailored to achieve a particular fuel flow change in response to CDP throughout the CDP range, as shown, for example, by the curves in FIG. 2. This criteria also applies to the other CDP responsive valve 26.

Referring to both FIGS. 1 and 2, at the lower PLA positions the CDP flow characteristics of the valves 26, 28 are added to the minimum flow characteristics of the valve 24. However, at low speed (i.e. region 29) the flow from the CDP valves 26, 28 is small by comparison to the minimum flow, since CDP is low. In this region fuel flow ($W_f$) therefore is essentially a different constant for each PLA, which gives rise to the decreasing negative slope of the minimum flow portions (i.e. 30, 31) as PLA increases.

As engine speed (N) increases with increasing PLA, the fuel flow ($W_f$) increasingly becomes a function mainly of CDP and PLA. This produces the flattening shown in the curves in FIG. 2 as engine speed (N) increases, and it occurs mainly because as PLA increases, the minimum flow from the valve 24 is decreased; the flow to the CDP responsive valve 26 is increased (by the increased opening of the window of the valve 16) and the flow through valves 26 and 28 is increased, as CDP increases, with (N).

At lower PLA positions the intersections (i.e. 34) of the engine steady state line and the PLA curves occurs at a significant angle. The principal reason for this is that all the PLA curves originate from the same maximum ratio unit point 36 which is defined by the absolute minimum ($W_f$) for zero CDP. This is produced by minimum flow valve 24 which, as stated before, supplies an absolute minimum fuel flow to the engine at the minimum PLA position, regardless of engine speed and CDP.

Because the intersection angle is high (at both low and high speeds) the ratio units associated with each PLA position for a particular engine speed on the steady state line is exceedingly well defined. Thus, there is high resolution, meaning: each PLA position results in a specific engine speed. The establishment of the constant slope minimum fuel flow portion (i.e. 30, 31) for each PLA provides the high intersection angle in the low engine speed region 29, where it is critical for speed accuracy, because the steady state curve noticeably has zero and negative slopes there. As the intersection angle in this region of the steady state curves gets smaller, engine speed control accuracy suffers directly because the intersection points merge, which produces imprecise operating points for each PLA in the low speed ring. Hence, by establishing a high intersection angle, the fuel control provides high speed accuracy in the low speed range. At high speeds the steady state curve slope is high and the intersection with the PLA curves therefore does not present a problem to speed accuracy.

Figure 3:
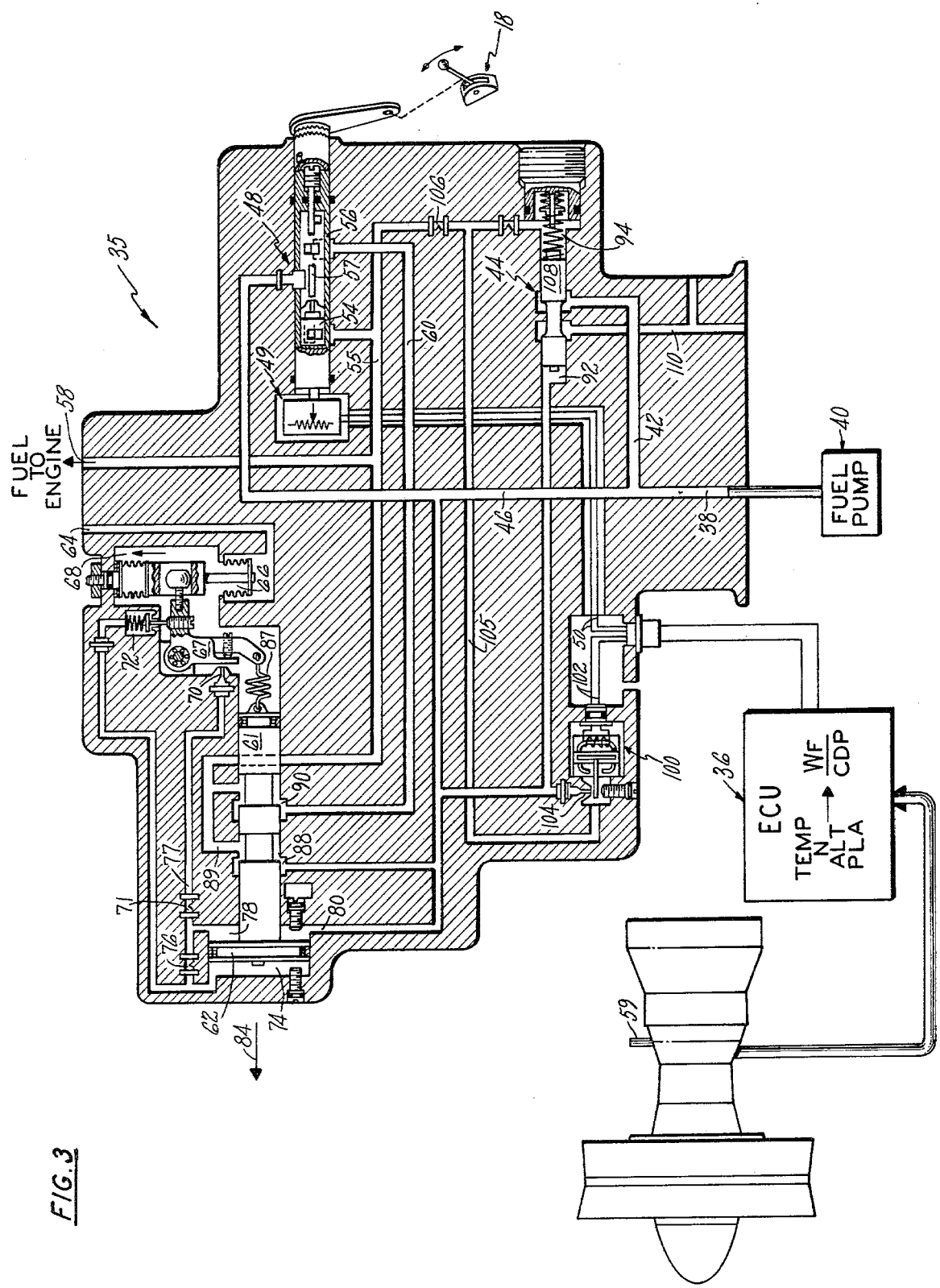
FIG. 3 is a cross-sectional view of a fuel control system embodying the present invention.

FIG. 3 shows a fuel control system 35 which incorporates the valve arrangement 10. This system includes an electronic computation unit (ECU) 36 which monitors various engine operating parameters and environmental parameters so as to control the operation of the fuel control to modify the fuel applied to the engine. A distinctive characteristic of this fuel control system is that without any significant impairment engine operation can continue in the absence of ECU control. The main reason for this is that hydromechanical portions establish the minimum flow to the engine necessary for acceleration and deceleration in response to the movement of the power lever. On the other hand, the ECU 36 modifies this "basic" flow in response to certain engine and environmental parameters. In this way, the reliability of a purely hydromechanical system is provided, together with the features of precise fuel control adjustment available from a continuously monitoring electronic fuel control system.

Fuel is supplied to an input port 38 from a fuel pump 40. The fuel flows through a line 42 to a regulating valve assembly 44 and then through another line 46 to a power lever valve 48, which is connected to the power lever 18. The valve 48 is connected to a potentiometer 49 which is used to supply an electronic signal to the ECU over lines 50; the signal indicates the power lever position. The power lever valve 48 has two variable opening windows 54, 56 and an engine shutdown window 57 which discontinues all fuel flow to the engine when the lever 18 is pulled back to a certain shutdown position. The window 54 provides a minimum flow window which provides minimum fuel flow through a line 55 to a fuel control outlet 58 which is connected to the engine fuel input 59. With the power lever in its minimum position, the window 54 is fully open and provides an absolute minimum fuel flow to the engine. The other window 56 is an acceleration window that opens as the power lever is advanced, which simultaneously closes the minimum flow window 54. The fuel from the window 56 flows into a line 60 to a dual window valve 61 connected to a servo 62. The servo 62 senses CDP on a port 64. As CDP increases, it pushes a bellows 66 upward 68, thereby rotating a bellcrank or arm 67 counterclockwise. As the bellcrank 67 is rotated counterclockwise, it progressively opens a positive rate flapper valve 70 and a negative flapper valve 72. As CDP decreases, the bellcrank 67 rotates clockwise and the valves 70, 72 progressively close. Together the valves 70, 72 provide negative rate compensation to the servo in a manner described in detail in the copending application thereon. The flapper valve 72 is connected to a low pressure side 74 of the servo. The low pressure side 74 is connected through an orifice 76 to the high pressure side 78 which connects with the valve 70 through an orifice 71 and a line 77. The high pressure side has an effective area which is less than the area on the low pressure side (i.e. one-half). The high pressure side 78 is connected over a line 80 to the fuel supply line 38. As CDP increases, for example, fuel flow through the orifice 76 increases as the valve 72 opens. This decreases the pressure on the low side of the servo which then moves to the left 84. A decrease in CDP, however, causes movement to the right by increasing the pressure on the low side as fuel flow through the valve 72 decreases. The servo moves the valve 61 which is coupled through a spring 87 to the bellcrank. The servo pulls the valve 61 in the direction 84 as CDP increases, which pulls the bellcrank in a direction causing the flapper valves 70, 72 to close and reducing the flow through the orifice 76 to a "null" level which holds the servo in position against the spring. A decrease in CDP results in an opposite reaction: the servo moves to open the valves to the null fuel point. Hence, as CDP changes, the servo moves the valve so as to return the valves 70, 72 to the null position. As the valve 61 moves, it varies the opening of a window 88 which is connected by a line 89 between the fluid supply line 38 and the fuel control output. Similarly, the movement of the valve 61 varies the opening of a second window 90 which receives fuel from the power lever window 56 over the line 60 and controls its flow to the output 58 over the line 89. Thus, the fuel output from the control increases with CDP, due to the increasing window area provided by the movement of the valve 61 to the left. Conversely, as CDP is reduced, the valve moves to the right and reduces fuel flow. At low CDP (i.e. start-up) the windows 88, 90 are closed. Similarly, at start-up, the window 56 is closed and fuel is supplied from the minimum fuel flow window 54. It should be obvious then that the operation of the servo and the valve 61 provide the functional operation of the valves 26, 28 in the simplified three circuit system shown in FIG. 1; the window 88 corresponds to the valve 28 and the window 90 corresponds to the valve 26. Similarly, the power lever valve provides the operation of the valves 16, 24 therein: the window 54 corresponding to the minimum flow valve 24 and the window 56 corresponding to the valve 16.

The pressure across the valves is held constant for the use of a regulating valve system 44. In this way, a constant $\Delta P$ (FIG. 1) is provided. The regulating valve system operates in a conventional manner by sensing fluid pressure on one side 92 and referencing it against a spring 94 which applies force to the other side of the valve. However, as described in the latter portion of this description, pressure across the valves may be modified to achieve dynamic changes in ratio units under control of the ECU.

Included in the fuel control is an electric torque motor 100 which receives electrical signals from the ECU over lines 102. In response to these signals the torque motor opens a flapper valve 104 which is normally closed in the absence of a signal. As mentioned in an earlier portion of this description, the ECU and torque motor provide an electrical interface to the hydromechanical fuel control to provide proper fuel ratio units to the engine in relation to power lever movement, engine speed, temperature, acceleration and the ambient characteristics, and thereby provide for safe engine operation in the absence of ECU control. In essence, the ECU may be programmed to close the loop on various engine parameters, such as engine speed and exhaust gas temperature and change ratio units, until the correct ratio units are achieved for the engine at any operating condition. The ECU accomplishes this by applying a correction signal to the torque motor to modify the fuel flow produced by the hydromechanical portion in order to achieve the precise ratio units. The ECU may consist of a hard wired circuit to modify fuel control or may be used with other known electronic monitoring systems. The modifications to ratio units in response to those parameters obviously depends on the specific characteristics of the gas turbine with which the fuel control is utilized. Thus it is obvious that a feature of this fuel control system is that through control of the torque motor, fuel flow requirements may be "modified" in numerous ways to tailor engine performance.

As the torque motor opens the flapper valve 104, there is fuel flow through a line 105 that goes to an orifice 106 which connects to the fuel control outlet 58. The increased flow caused by the opening of the flapper valve produces a pressure drop across the orifice 106, and this pressure drop increases the pressure drop across the windows 88, 90 in the valve 61 and the windows 54, 56 in the power lever valve 48 that are in circuit with the orifice 106 by reason of their parallel connections to the fuel outlet 58. The pressure regulating valve 44 maintains constant pressure upstream from the windows, at 42. It does this through movement of the valve 108 which moves to close the path between the line 42 and a bypass line 110 as the pressure across orifice 106 changes. This reduces bypass flow and causes more flow to the windows through line 46. In this fashion fuel flow through the fuel outlet is increased indirectly by operation of the torque motor. It is significant that there is substantial "gain" between the flow through the torque motor flapper valve and the actual increase in fuel flow at the fuel outlet that results from the change in pressure it brings about. As a result of this, a small, low powered torque motor may be used. In general, this means that it will have very small hysteresis qualities, thereby making it possible to obtain extremely precise modifications of the fuel flow.

The foregoing is a detailed description of a preferred embodiment of the present invention and may suggest, to one skilled in the art, various modifications and variations therein and thereto without departing from, and nevertheless embracing, the true scope and spirit of the invention embodied therein and described in the following claims.

We claim:

1. A fuel control for controlling fuel flow to a gas turbine engine in response to different engine power settings, comprising:

three parallel fuel flow circuits between a common fuel input port and a common fuel output port, and means for maintaining constant fuel pressure between said input and output ports, a first of said circuits including means providing a minimum fuel flow to the engine at a preselected minimum power setting, corresponding to a minimum engine operating level, said minimum flow decreasing in an inverse relationship to power setting, a second of said circuits including means providing fuel flow as a function of engine compressor discharge pressure, a third of said circuits including means for providing fuel flow which increases in direct relationship to the power setting and is a function of compressor discharge pressure.

2. A fuel control according to claim 1, wherein, said second and third circuits are closed when the engine is operated at and below said minimum level.

3. A fuel control for a gas turbine engine connectable to the engine power control lever, said fuel control comprising:

a first valve assembly connected to the power lever, said assembly containing first and second coupled fuel flow control windows, said first window supplying a minimum fuel flow to the engine at a preselected minimum power lever setting corresponding to a minimum engine operating level, and decreasing said minimum flow as the power lever is advanced;

a second valve assembly responsive to compressor discharge pressure and containing third and fourth fuel control windows for supplying fuel to the engine;

said third window receiving fuel from said second window and controlling the flow therefrom to the engine in a preselected relationship to discharge pressure, said second window supplying increasing fuel flow to said third window as the power lever is advanced;

said fourth window supplying fuel to the engine in response to compressor discharge pressure.

4. A fuel control according to claim 3, wherein, said second, third and fourth windows are closed when the engine is operated at and below said minimum level.

* * * * *